March 10, 1942.    H. C. HARRISON    2,275,625
ELECTROMAGNETIC MOTOR UNIT
Filed July 31, 1940    3 Sheets-Sheet 1

INVENTOR
H. C. HARRISON
BY
G. H. Hyatt
ATTORNEY

March 10, 1942.     H. C. HARRISON     2,275,625
ELECTROMAGNETIC MOTOR UNIT
Filed July 31, 1940     3 Sheets-Sheet 2

INVENTOR
H. C. HARRISON
BY
G. H. Huydt
ATTORNEY

March 10, 1942.  H. C. HARRISON  2,275,625
ELECTROMAGNETIC MOTOR UNIT
Filed July 31, 1940  3 Sheets-Sheet 3

INVENTOR
H. C. HARRISON
BY
G. H. Heydt
ATTORNEY

Patented Mar. 10, 1942

2,275,625

UNITED STATES PATENT OFFICE 2,275,625

ELECTROMAGNETIC MOTOR UNIT

Henry C. Harrison, Port Washington, N. Y., assignor to Bell Telephone Laboratories, Incorporated, New York, N. Y., a corporation of New York Application July 31, 1940, Serial No. 348,611

7 Claims. (Cl. 172—126)

This invention relates to improvements in electromagnetic motor units of the balanced armature type and particularly to a unit of this type when employed as the driving means for a light modulating mirror employed in sound film recording systems.

It is the object of this invention to provide a compact electromagnetic motor unit of simple construction, having high sensitivity and uniform performance over a wide frequency range.

Another object of the invention is to provide a small, compact electromagnetic unit having high flux density in the air-gap and a light, flexibly supported armature which will give undistorted response over an extensive frequency range.

It is a further object of this invention to provide an electromagnetic unit of the type described, the elements of which may be quickly and easily assembled into a complete unit with the moving and stationary elements therefor supported in the predetermined space relation necessary for efficient operation.

A feature of the invention resides in the utilization of a cylindrical element of relatively small diameter which is fixed in position with respect to the elements of the electromagnetic device to provide a pivot about which the balanced armature may rotate and which further acts as a spacing means for maintaining the air-gap between the pole-pieces and armature.

Another feature resides in the provision of a U-shaped member of magnetic material, a permanent magnet and bifurcated pole-piece mounted in said member and a yoke joining the legs of said member, the yoke having a reduced central portion extending between the polar extensions of the bifurcated pole-piece to form a pole of opposite polarity thereto.

The invention will be best understood from the following detailed description, reference being had to the accompanying drawings.

Figure 3:
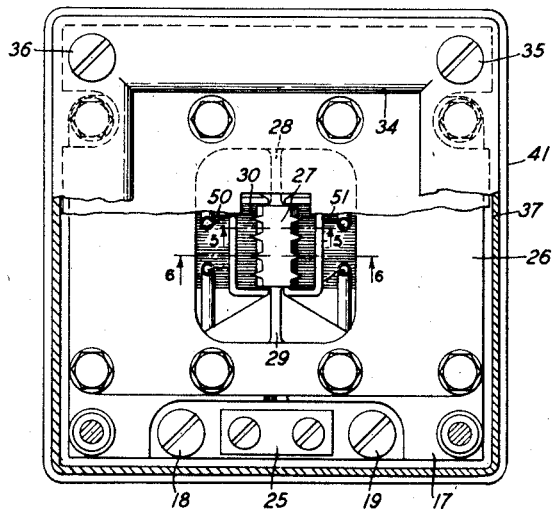
Fig. 3 is a top view of the device.
Figure 5:
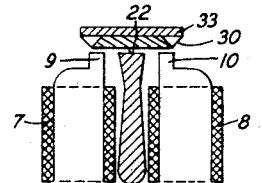
Figure 6:
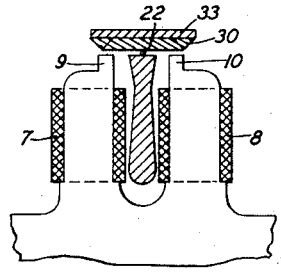
Figure 7:
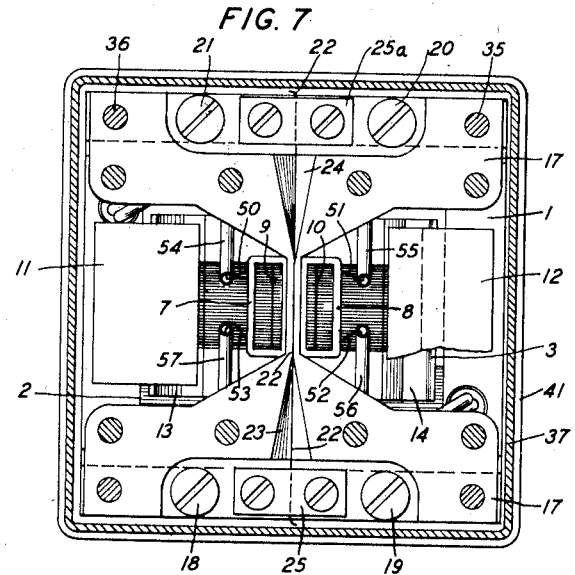

Figs. 5 and 6 are detailed sectional views showing the relative positions of the pole-pieces with respect to each other and to the vibratory armature, Fig. 5 being a section along line 3—3 of Fig. 3, and Fig. 6 being a section along line 4—4 of Fig. 3;

Fig. 7 is a top plan view with the cover plate removed; and

Figure 4:
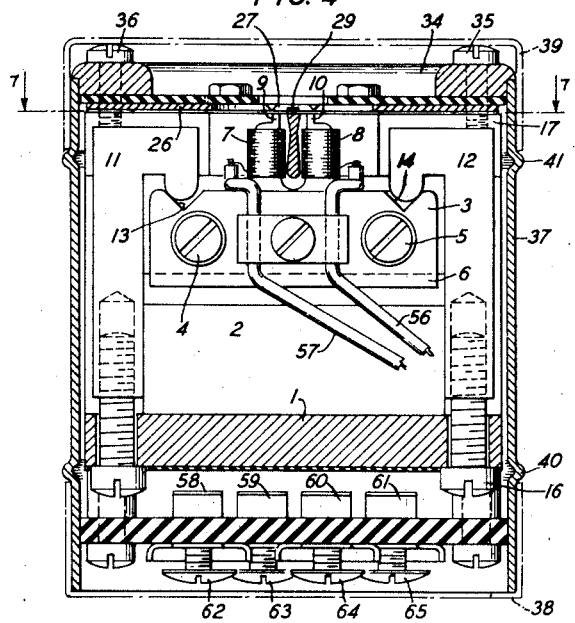
Fig. 4 is a side elevation, partly in section.
Figure 8:
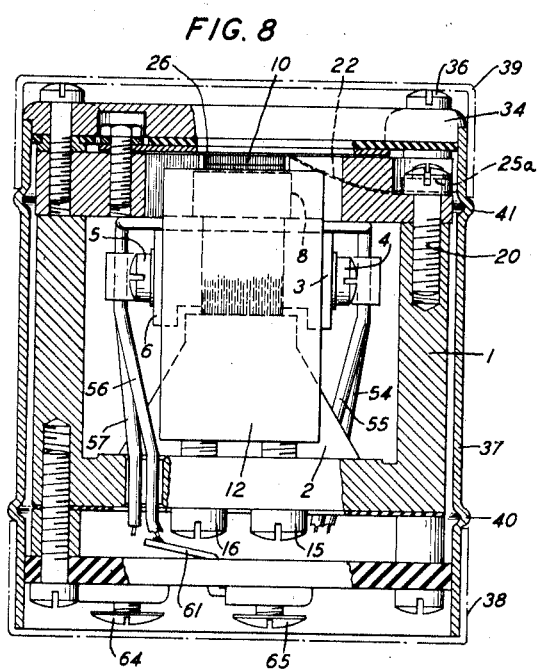

Fig. 8 is a side elevation partly in section, the view being taken at right angles to that shown in Fig. 4.

Figure 1:
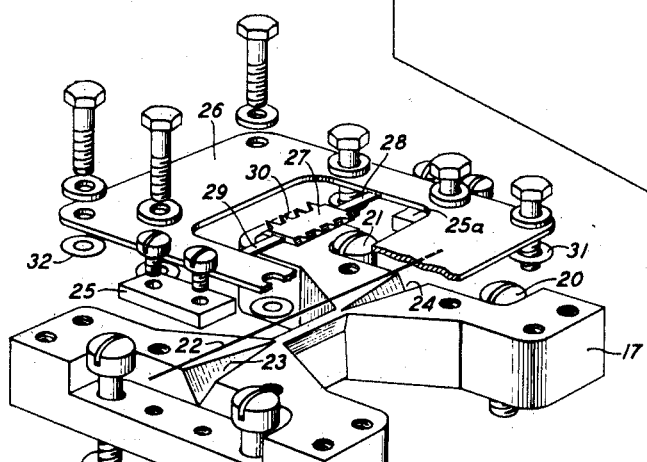
Fig. 1 is an exploded view showing the various parts of the device in the approximate order and relation in which they may be assembled.
Figure 1:
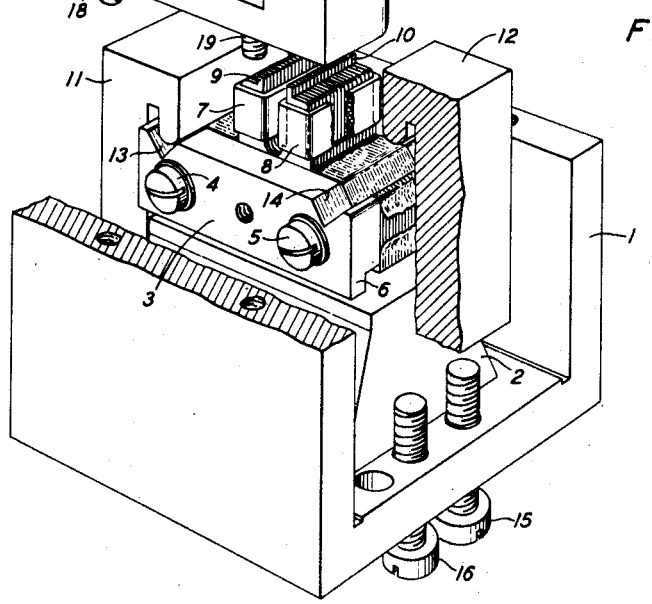

Referring to the drawings, 1 represents a U-shaped yoke of magnetically permeable material which acts as the basic frame on to which other parts of the device may be assembled. A powerful permanent electromagnet 2 is supported symmetrically within the U of yoke 1 as may be seen in Figs. 1 and 8. The sectional form of this magnet may be clearly seen in Fig. 8, the magnet being in effect a truncated triangular prism surmounted by a section of rectangular form.

One pole-piece for the permanent magnet is made up in laminated form. The laminations are clamped together by means of two external members one of which is indicated at 3, there being a corresponding member not shown in Fig. 1. These two members are secured together by means of machine screws 4 and 5 which extend through suitably disposed apertures in the laminations and hold them securely together so that they may be removed as a unit. When the laminations are lowered on to the upper face of the permanent magnet they are maintained against motion in one direction by means of overhanging flanges 6 which cooperate with the rectangular upper section of the magnet to permit a limited motion only between said pole-pieces at the upper face of the permanent magnet as may be more clearly seen in Fig. 8. Form wound coils 7 and 8 are fitted snugly over bifurcated extensions of the pole-piece these bifurcated extensions being reduced to a greatly decreased section at 9 and 10 in order to provide flux concentration with respect to the armature. The laminated pole tip is held against transverse motion in a direction at right angles to that previously discussed by means of two clamping members 11 and 12. These members are made of brass and are substantially L-shaped, the L being inverted and provided with a rounding of the short leg which cooperates with a V-shaped groove extending across the entire width of the pole tip assembly. These grooves are indicated at 13 and 14. The L-shaped members are secured to yoke 1 by means of machine screws such as 15 and 16. An H-shaped yoke or cap-piece 17 is secured to yoke 1 by means of machine screws such as 18, 19, 20 and 21. The central portion of this member is greatly reduced in section, being so dimensioned as to fit between coils 7 and 8 mounted on the bifurcated tips of the pole-piece.

Assuming that assembly of the device has been completed to this point, the magnetic circuits may now be given consideration. Magnetic flux will pass from the bottom of the permanent magnet up the two legs of the yoke 1 in parallel and will then flow from opposite directions into the reduced central section of cap-piece 17. From this point the flux will divide and flow equally through the bifurcations of the pole-piece and thence to the upper side of the permanent magnet. This magnetic structure permits extremely high flux densities in the air-gap between the pole faces.

After assembly has proceeded to this point the exposed surface including laminated tips 9 and 10 may be planed or ground flat in a single operation.

Figure 2:
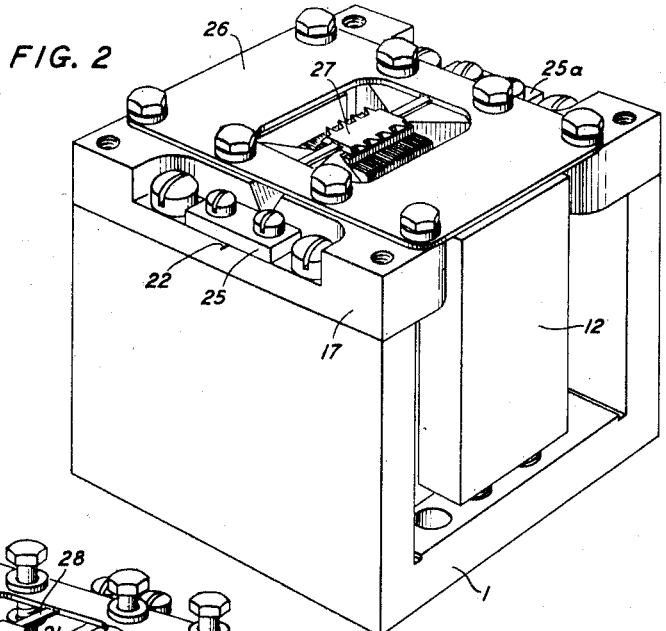
Fig. 2 is a perspective view of the assembled device, removed from its outer casing.

A wire 22 rests on the reduced connecting section of cap-piece 17 which forms one of the pole faces and its ends are guided by way of V-shaped notches 23 and 24 and then clamped under tension by means of clamping plates 25 and 25a as may be seen more clearly in Fig. 2. Suitable machine screws are provided to maintain these clamps securely in position. The function of the wire 22 will be described at a later point in the specification.

A plate 26 has formed integrally therewith an armature 27 which is torsionally supported within a hollow square by means of integral supporting members 28 and 29, the armature being free to move by virtue of the torsibility of members 28 and 29. The edges of the armature 27 are provided with teeth or serrations 30 for a purpose to be more fully described hereinafter. The armature with its bearings and integral supporting plate is preferably formed by a punching operation. The underside is ground to accurate flatness. With the pole-pieces and yoke 17 correspondingly accurately flat, the air-gap between the armature and pole-pieces may be regulated very accurately by spacing plate 27 from cap-piece 17 by means of shims of the desired thickness. Such shims are indicated at 31 and 32. The wire 22 is of a diameter corresponding to the thickness of these shims so that when in position it provides a support for the armature about which said armature may rock. The relative position of the electrical coils, bifurcated pole-tips, pole-pieces, armature, and bearing wire may be easily understood by reference to Figs. 5 and 6.

A mirror 33 is cemented to armature 30 and may be oscillated thereby. Serrations 22 act as supporting brackets for the outer portions of the mirror and have been so shaped in order to reduce the mass of the armature.

An outer cap 34 in the form of a hollow square is secured to member 17 by means of suitable machine screws as indicated at 35 and 36. Member 34 surrounds plate 26 and provides a covering for the parts mounted in the recessed portion of member 17 which includes the wire clamping plates 25 and 25a and various mounting screws.

A shell 37 is provided as a container for the device, the closure being completed by means of cap-pieces 38 and 39 which abut against ridges 40 and 41 formed in sleeve 37. Sleeve 37 cooperates with a flange formed in the outer periphery of member 34 as may best be seen in Fig. 8.

Electrical conductors 50, 51, 52 and 53 extend from coils 7 and 8, and are protected by flexible insulating tubing indicated at 54, 55, 56 and 57. These conductors are soldered to lugs 58, 59, 60 and 61 (Fig. 4) as is indicated in one case in Fig. 8. External connections are made to the various lugs by means of screws 62, 63, 64 and 65.

The steady flux emanating from permanent magnet 2 flows from the lower pole of the magnet, through the two legs of U-shaped member 1 in parallel thence from opposite sides of H-shaped member 17 to the reduced central pole face where it divides equally and flows through pole tips 9 and 10 and thence back to the other pole of the permanent magnet.

Coils 7 and 8 are so connected that the magnetic fields generated by them in response to electric currents are of opposite polarity. Any magnetic flux generated by these coils circulates through the laminated pole-piece and tips, its path being completed across the small air-gaps and the reduced section of member 17. Thus at any given instant the electromagnetic flux generated by one coil will be additive with respect to the steady flux flowing through the associated pole tip and the electromagnetic flux generated by the other coil will, at the same instant, be subtractive with respect to the steady flux flowing through its associated pole tip. This general type of magnetic system for driving an oscillatory member is old in the art and is believed to require no further description.

What is claimed is:

1. An electromagnetic device comprising a plurality of pole elements having their pole faces in a common plane, torsional supporting members, a rockable armature suspended above said pole elements by said supporting members, and a fixed cylindrical element disposed in contact with one of said pole elements and with said armature to maintain said armature a predetermined distance above said pole elements and to provide a pivot about the axis of which said amature may rotate.

2. An electromagnetic device comprising a pair of pole elements of like polarity, a third pole element of opposite polarity centrally disposed between said first-mentioned pole elements, said pole elements having coplanar pole faces, means for producing a magnetic field, an armature rotatable toward and away from said pair of pole elements, torsional supporting means for said armature, means to suspend said armature a predetermined distance above said pole elements, and means comprising a fixed cylindrical element disposed between said centrally disposed pole element and said armature providing a pivot about which said armature may rotate.

3. In combination in an electromagnetic device, a U-shaped member of magnetic material, a permanent magnet mounted within said member with one of its poles in magnetic conductive connection therewith, a bifurcated pole-piece mounted on said permanent magnet in magnetic conductive connection with the other pole thereof, means joining the legs of said U-shaped member, said means having a reduced portion extending between the polar extensions of said bifurcated pole-piece to form a centrally disposed pole of opposite polarity, and a balanced armature disposed above said pole-pieces.

4. An electromagnetic device comprising a plurality of pole elements having their pole faces in a common plane, torsional supporting members, a rockable armature suspended above said pole elements by said supporting members, a fixed cylindrical element disposed in contact with one of said pole elements and with said armature to maintain said armature a predetermined distance above said pole elements and to provide a pivot about the axis of which said armature may rotate, and light reflecting means secured to said armature.

5. In combination in an electromagnetic device, a U-shaped member of magnetic material, a permanent magnet mounted within said member with one of its poles in magnetic conductive connection therewith, a bifurcated pole-piece mounted on said permanent magnet in magnetic conductive connection with the other pole thereof, means joining the legs of said U-shaped member, said means having a reduced portion extending between the polar extensions of said bifurcated pole-piece to form a centrally disposed pole of opposite polarity, a bearing member supported on said reduced portion and an armature rockable on said bearing member and spaced and supported thereby.

6. In combination in an electromagnetic device, a U-shaped member of magnetic material, a permanent magnet mounted within said member with one of its poles in magnetic conductive connection therewith, a bifurcated pole-piece mounted on said permanent magnet in magnetic conductive connection with the other pole thereof, said pole-piece consisting of laminations secured together so as to form a unitarily removable structure, mounting means for said structure, means joining the legs of said U-shaped member, said means having a reduced portion extending between the polar extensions of said bifurcated pole-piece to form a centrally disposed pole of opposite polarity, and a balanced armature disposed above said pole-pieces.

7. An electromagnetic device comprising a plurality of pole elements having their pole faces in a common plane, torsional supporting members, a rockable armature formed integrally with said supporting members and suspended above said pole elements thereby, and a fixed cylindrical element disposed in contact with one of said pole elements and with said armature to maintain said armature a predetermined distance above said pole elements and to provide a pivot about the axis of which said armature may rotate.

HENRY C. HARRISON.